(Model.)

M. R. LONGACRE.
CASH REGISTER AND INDICATOR.

No. 406,748. Patented July 9, 1889.

Fig.1.

WITNESSES:
David S. Williams
Alex. Barkoff

INVENTOR
Matthias R. Longacre
BY
Howson and Howson
his ATTORNEYS (Model.)

M. R. LONGACRE.
CASH REGISTER AND INDICATOR.

No. 406,748. Patented July 9, 1889.

WITNESSES:
E. J. Griswold
Alex. Barkoff

INVENTOR
Matthias R. Longacre
BY
Howson and Howson
his ATTORNEYS

(Model.)

M. R. LONGACRE.
CASH REGISTER AND INDICATOR.

No. 406,748. Patented July 9, 1889.

WITNESSES:

INVENTOR
Matthias R. Longacre
BY
Howson and Howson
his ATTORNEYS (Model.)

M. R. LONGACRE.
CASH REGISTER AND INDICATOR.

No. 406,748. Patented July 9, 1889.

WITNESSES:
E. J. Griswold
Alex. Barkoff

INVENTOR
Mattias R. Longacre
BY
Howson and Howson
his ATTORNEYS (Model.)

M. R. LONGACRE.
CASH REGISTER AND INDICATOR.

No. 406,748. Patented July 9, 1889.

WITNESSES:
David S. Williams
Alex. Barkoff

INVENTOR
Matthias R. Longacre
BY
Howson and Howson
his ATTORNEYS

UNITED STATES PATENT OFFICE.

MATTHIAS R. LONGACRE, OF PHILADELPHIA, PENNSYLVANIA.

CASH REGISTER AND INDICATOR.

SPECIFICATION forming part of Letters Patent No. 406,748, dated July 9, 1889.

Application filed October 18, 1888. Serial No. 288,497. (Model.)

*To all whom it may concern:*

Be it known that I, MATTHIAS R. LONGACRE, a citizen of the United States, and a resident of Philadelphia, Pennsylvania, have invented an Improved Indicating and Registering Machine, of which the following is a specification.

My invention consists in certain improvements in the cash register and indicator for which I have obtained Letters Patent of the United States No. 369,193, dated August 30, 1887, and my present improvements have been designed mainly with the view of simplifying the construction of the mechanism, rendering it more economical to build, less liable to get out of order, and more reliable and perfect in its operation.

My present machine conforms in its main principles of construction and operation to the cash registering and indicating mechanism of my former patent, and embodies among its principal elements the sets or series of numbered operating-keys for the several columns of figures, together with sliding rack-bars or number-plates impelled by springs and controlled by the keys to show the numbers through openings in the case of the machine. There is also a locking-bolt for each set of keys and devices for restoring the parts to their normal positions. I also combine with the indicating mechanism registering or adding devices for the successive sales.

In the accompanying drawings, Fig. 3ª is a detached view showing the locking-bolt in another position.

As I have already said, the machine has among its essential features the series of sliding number-plates impelled by suitable springs, a series of numbered keys for each moving number-plate, a locking-bolt for each set of keys, and devices for returning the parts to their normal positions. These number-plates in my patent already issued were shown as having a sliding movement and were termed "number-plates" because they carried on their faces the figures or numbers 0 to 9, which figures or numbers would show through suitable openings in the casing to indicate the amount to be registered when the corresponding keys were operated. It is not, however, essential that the numbers should be upon the plates themselves, although I prefer to arrange them in that way. The indicating-numbers may be upon the wheels to be operated by the moving plates, or upon both the plates and wheels, as I shall hereinafter describe. In the present machine, as in my former one, I have illustrated four of these moving plates, which I will continue to call "number-plates" to avoid confusion. These four number-plates are provided for two columns of cents and for two columns of dollars; but the number of these plates and devices combined therewith may be increased, if desired.

As the construction and operation of the several number-plates with their keys and operating parts are alike, a description of one will apply to all, and in the following explanation it will suffice to describe one set of these devices, or, in other words, one section for one column of figures.

Figures 3, 3A:
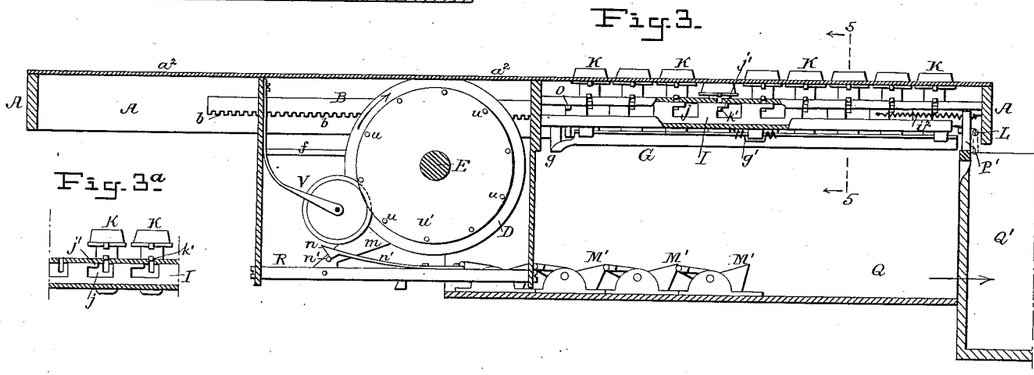
Fig. 3 is a longitudinal sectional view on the line 3 3, Fig. 1, but showing the drawer pulled out and the parts in somewhat different positions.
Figure 4:
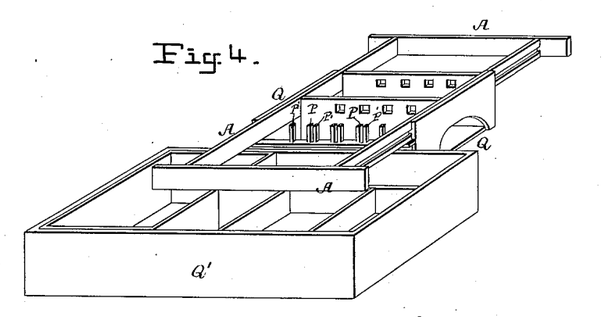
Fig. 4 is a skeleton perspective view of the fixed and sliding frames with the cash-drawer.

A is the fixed casing or frame, which is shown in Fig. 4 in skeleton form. In this frame are mounted the several key-bars A', Fig. 1, each of which carries a sliding rack-plate or number-plate B, the nine numbered operating-keys K, a locking-bolt I, and a movable retaining-frame G, by which the keys control the movement and position of the sliding number-plate. Each key-bar, with its keys, retaining-frame, sliding number-plate, and locking-bolt, is complete in itself and independent of the other bars, with which it is interchangeable. Each number-plate B is preferably of T-section and adapted to slide in a corresponding groove in the key-bar. The lower flange of the number-plate is in the form of a rack $b$, into which gears a spur-wheel D, mounted to turn freely upon a shaft E in the casing. (See Fig. 2.) To the hub of this wheel D is secured one end of the coiled spring F, while the other is connected to an arm $f$ on the frame or casing, Fig. 11, and the parts are so arranged that the spring tends to turn the wheel D in the direction of the arrows, Figs. 2 and 3, so as to impel the number-plate inward in the direction of its arrow, Fig. 2, or, in other words, toward the operator when released from its retaining-catch. In the present machine the sliding number-plate is therefore normally (that is, before a key is depressed) extended outward from the key-bars or away from the operator, as illustrated in Figs. 1 and 2.

Figure 1:
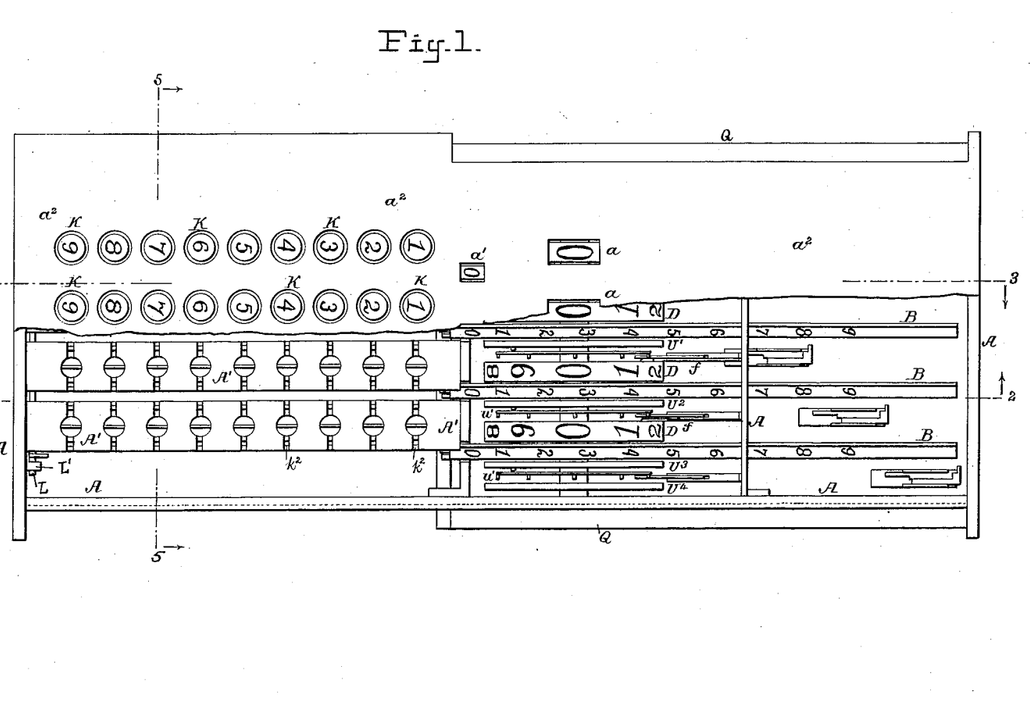
Figure 1 is a plan view (with the top plate partly broken away) of one form of my improved machine with a part of the cover-plate broken off.
Figure 2:
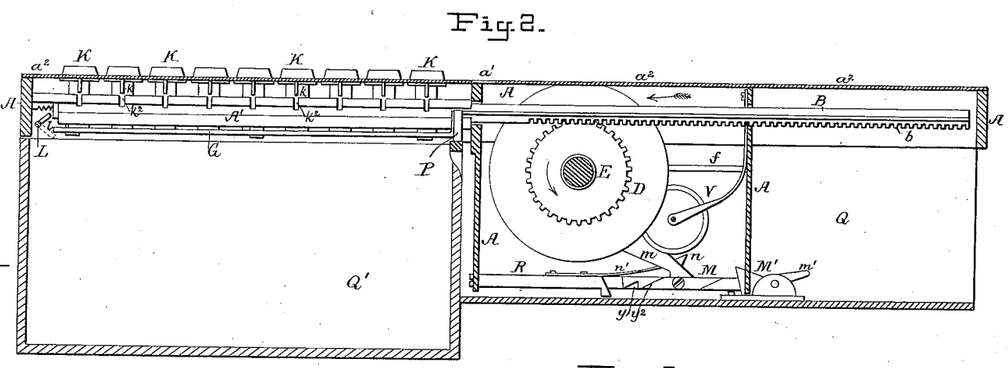
Fig. 2 is a longitudinal sectional view of the same on the line 2 2, Fig. 1.
Figure 5:
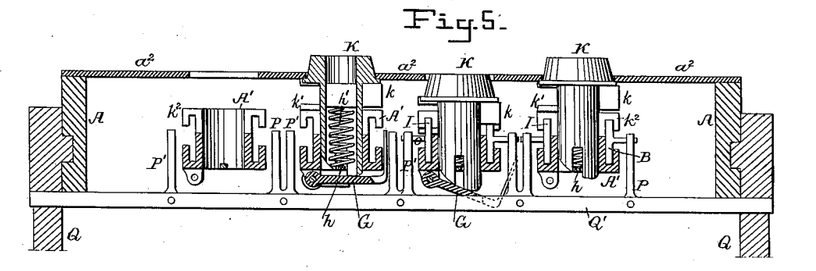
Fig. 5 is a transverse section on the line 5 5, Figs. 1 and 3, but drawn to a larger scale, and showing different operating-keys in different positions, one of the keys being entirely removed from its key-bar.

As will be seen on reference to Figs. 1, 2, and 3, each key-bar carries nine numbered operating-keys K, passing vertically through the key-bar. In Fig. 5 I have shown each key as having a tubular stem containing a spiral spring $h'$, which at its lower end rests upon a longitudinal bar $h$, Fig. 5, and at its upper end tends to press the key upward. The tubular portion of the key-stem is slotted to enable it to straddle the longitudinal bar $h$. The upward movement of the key is limited by a rim on the head of the key coming into contact with the top plate $a^2$ of the casing, Fig. 5. Each key has upon the stem a shoulder or projection $k$ on one side to serve as a stop for the sliding number-plate or rack-bar B, while on the other side the key has a catch $k'$ to engage with the locking-bolt I, hereinafter described.

Figures 12, 14:
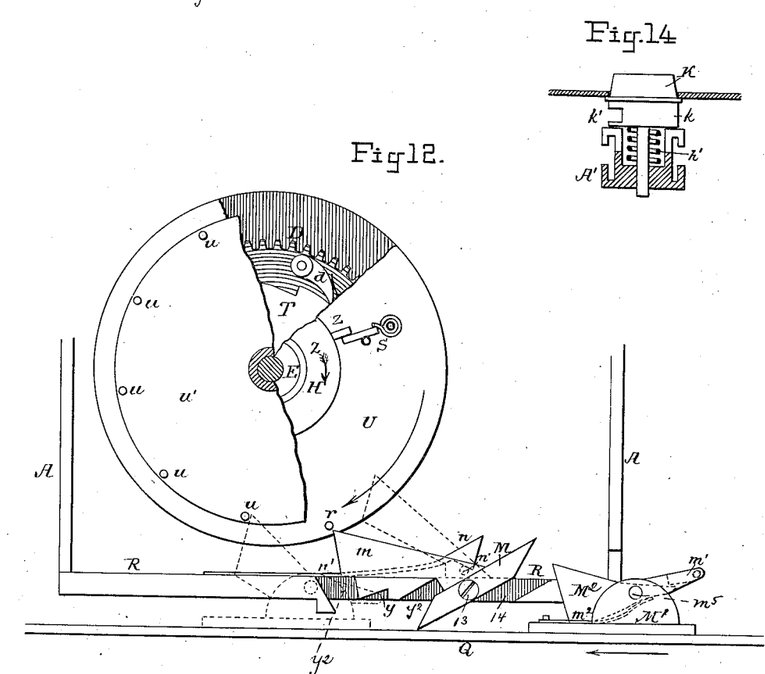
Fig. 12 is a side view of the same partly broken away.
Fig. 14 is a view of a modified form of operating-key.

Instead of making the key-stem tubular, I may make the stem of small diameter and put a spring around, as shown in Fig. 14.

Figure 6:
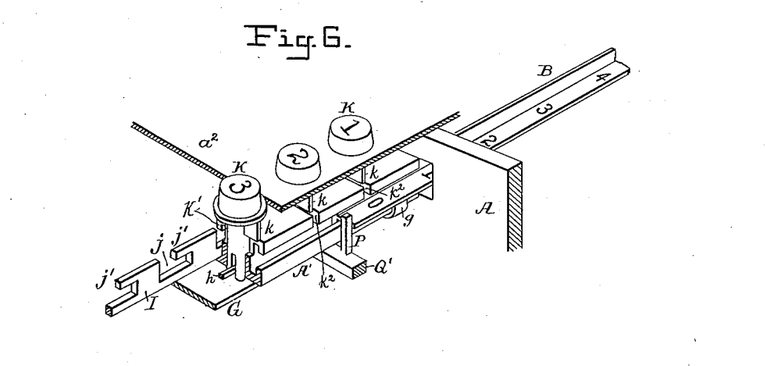
Fig. 6 is a perspective sectional view of a part of the machine.
Figures 7, 8, 9, 10:
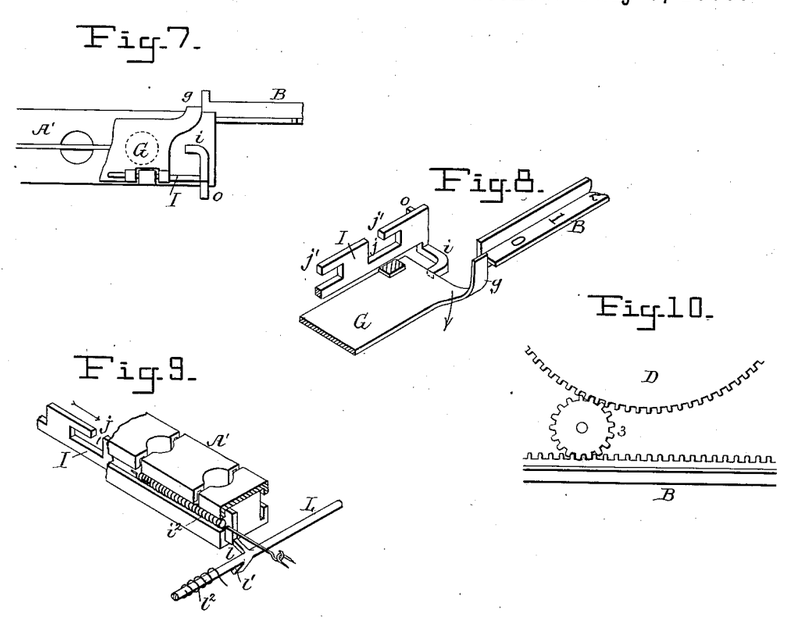
Fig. 7 is an inverted plan view of the key-bar at one end.
Fig. 8 is a perspective view of the outer ends of the locking-bar and hinged retaining-frame and inner end of the sliding plate detached.
Fig. 9 is a perspective view of devices at the inner end of the key-bar.
Fig. 10 is a view indicating a modification.

Each sliding number-plate B is held in its normal outward position against the action of the spring F by means of a finger $g$, Fig. 8, on the end of the hinged retaining-frame G. In the present instance this hinged retaining-frame is pivoted to the under side of the key-bar at one side, Fig. 5, in such a position that it will be directly acted upon by the lower end of any key K which may be depressed, so that the intermediate levers H of my former machine have by this means been dispensed with. The retaining-frame G is acted upon by a suitable spring $g'$, Fig. 3, which tends to press it upward, so that the projecting finger at its outer end (when the sliding number-plate B is pushed outward from the key-bar and from the operator, as indicated in Figs. 1, 2, and 6) will engage with the inner end of the number-plate B to hold it out until such time as a downward pressure of one of the keys will free the finger $g$ from the plate and allow the latter to be moved inward into the key-bar and toward the operator by its spring F, Fig. 11.

As in my former machine, the particular key which has been pressed down to cause the release of the sliding number-plate is also used to arrest that number-plate at the desired point, for when the key is pressed down the projection or shoulder $k$ thereon will enter a notch $k^2$ in the upper side of the key-bar and descend into the path of the sliding number-plate and stop its further progress. Thus if key No. 3, for instance, is pressed down the sliding number-plate will be arrested in such a position that the corresponding No. 3 on the plate will show through the opening $a'$ in the casing, Figs. 1 and 2. In the groove on the other side of each key-bar from the sliding number-plate is arranged the sliding locking-bolt I, which has notches $j$, corresponding in number with the keys, Figs. 3, 6, 8, and 9. As shown more clearly in Figs. 6 and 8, each notch $j$ has a projecting finger $j'$. The sliding locking-bolt I has a limited movement in its guides, being acted upon by a spring $i^2$, Fig. 9, which tends to pull the bolt in the direction of its arrow. When the parts are out of action, the locking-bolt is held in its outward position by means of a catch or finger $l$ upon a rock-shaft L, Fig. 9, mounted in bearings L' in the front of the frame, Figs. 1, 2, and 3, so that no one of the keys (owing to the catches $k'$ on the locking-bolt) can be depressed. This rock-shaft L has an arm or arms $l'$, Fig. 9, which is acted upon by the sliding frame Q, hereinafter described, to move the arm toward the operator and turn the shaft L, so that the catches $l$ on the latter will be released from engagement with all the locking-bolts I. The latter then move forward under the action of their several springs to such a position that the open notches will be immediately beneath the projecting catches $k'$ on the several keys, as shown in Fig. 3ª. Any one of the keys may be then depressed to release a sliding number-plate. Each locking-bolt I, when released from the corresponding catch $l$ on the shaft L, is prevented for the time being from going farther inward than the position last described, owing to a projecting finger $i$, Figs. 7 and 8, on the outer end of the locking-bar coming into contact with the end of the hinged retaining-frame G. When, however, one of the keys K on a key-bar is depressed, and the retaining-frame G consequently pressed downward, as indicated by the arrow in Fig. 8, the corresponding locking-bolt I will be released at the same time that the sliding number-plate of that key-bar is released. Therefore under the action of its spring $i^2$ and while the key K is depressed the locking-bolt I will move sufficiently far inward toward the operator for the finger $j'$ to pass over and engage with the catch $k'$ upon the depressed key. The latter will consequently be locked in its downward position, as shown in Fig. 3, and at the same time the remaining keys will be locked in their upper positions.

In order to restore the parts to their normal positions, I make use of a sliding frame Q like the slide Q of my former patent, but which acts directly upon the sliding plates and locking-bolts. It is in the present instance shown as mounted to slide in guides in the fixed frame A. (See Fig. 4.) Where a cash-drawer is to be used in connection with the apparatus this sliding frame Q may be the drawer itself, or, as shown in the drawings, the cash-drawer Q' may be carried by the sliding frame. The sliding frame has upon it projecting fingers P and P', Figs. 4 and 5, each of the former P adapted to act upon the inner end of a sliding number-plate, while the finger P' is adapted to act upon a pin $o$ upon the outer end of a locking-bolt I, Figs. 3, 7, and 8. When the sliding frame or cash-drawer is pushed by the operator into its normal closed position in the machine in a direction opposite to that shown by its arrows, Figs. 2 and 3, the fingers P will push forward the sliding number-plates, Fig. 6, against the action of their springs F, until they have been pushed all the way out, Fig. 2, from the key-bars and from the operator. Then the upwardly-projecting finger $g$ of each retaining plate G under the action of its springs $g'$ will rise up behind the end of the number-plate, and then retain it in its outward position, Fig. 2, until in a new operation one of the keys depresses the hinged retaining-plate G. At the same time (when the sliding frame Q is thus pushed into the normal closed position in the machine by the operator) the finger P' as the frame approaches the end of its movement will come into contact with the pin $o$, Figs. 3 and 8, on the locking-bolt I, and by the time the frame has completed its movement will have pushed the locking-bolt to its extreme outward position from the operator, to be there retained by an arm $l$ on the rock-shaft L engaging with the inner end of the locking-bolt, as shown in Fig. 9. A spring $l^2$, Fig. 9, which may be coiled around the shaft L, tends to press the arms $l$ in such a direction that they will engage with the ends of the locking-bolts when the latter are pushed to such extreme outward positions.

It will be seen that so long as the sliding frame or cash-drawer Q' remains in its normal inward position within the machine all the keys are locked by their bolts I, so that the indicating devices cannot be operated; but upon the operator simply pulling the slide or cash-drawer out toward him, as indicated by the arrow, Fig. 2, the shaft L will be so turned by a projection on the inner end of the sliding frame or cash-drawer acting on the arm $l'$ that the several locking-bolts I will be released from their arms or catches $l$, and under the action of their springs the bolts I come to the position illustrated in Fig. 3ª. Any of the keys may then be depressed while the said bolts are being temporarily retained by the frame G, Fig. 8.

From the foregoing description it will be seen that when the parts have once been set ready for an indication, but before a key has been depressed, the cash-drawer Q' can be freely moved in and out without affecting the indicating mechanism and consequently also without affecting the adding mechanism, as the latter is first operated from the indicating mechanism, as will be hereinafter seen. On the other hand, as soon as an indication has been made by depressing one or more of the keys the cash-drawer comes into play as an operative part of the combination to restore the parts to their normal positions and to transmit motion to the adding or registering mechanism, as hereinafter set forth.

As I have already said, I prefer to retain the numbers upon the sliding plates B to show through the opening $a'$ in the casing; but I also prefer to place numbers to correspond upon the enlarged flanged peripheries of the wheels D into which the racks on the number-plates gear, so that these wheels become indicating-wheels. Openings $a$, Fig. 1, are formed in the casing for the numbers upon these wheels to be seen by the customer according to the registry or indication made by the devices already described. If the machine is to be placed in or upon the counter between the salesman and the customer, the number upon the keys and upon the sliding number-plates will be arranged to face in the opposite direction from the numbers upon the peripheries of the wheels D, so that the customer may read the amount of the cash registry from the numbers upon the wheels, while the salesman will read the amount from the numbers upon the sliding number-plates showing through the opening or openings $a'$.

It will be evident that, as the dollars and cents must be read by the customer in the ordinary way from his left to his right, the salesman on the other side of the counter will have to accustom himself to reading backward— that is, from his right to his left. When, however, the machine is to be placed in a position where both the customer and the salesman will read from the same side—as, for instance, when the machine is to be placed on a shelf behind the counter—the numbers will be arranged so that they will read in the ordinary way from left to right for the salesman as well as the customer, and in such case it will be unnecessary to have the numbers upon both the wheels D and the number-plates. One or the other set of numbers may be dispensed with. If, for purposes of constructing the machine, it is desired to arrange the wheels D above instead of below the sliding number-plates, the latter will have their racks on the upper side, as shown in Fig. 10, and the wheels D may be geared to the racks through the medium of pinions 3.

To register or add up the successive sales, as well as to indicate them to the customer, as already described, I provide registering-dials or adding-wheels U U' U², &c., for units, tens, hundreds, &c., and these wheels I mount upon the same shaft E which carries the wheels D, and in this instance I have shown them arranged alternately; but these indicating and adding wheels can be arranged on the shaft in any order in which the indicating-wheel can transmit its motion to its corresponding adding-wheel. Each adding-wheel U U', Figs. 11 and 12, has a tubular shaft passing through the hub of the wheel D, and, with the exception of the first adding-wheel U, for the lowest column of figures, each wheel has upon the other end of its tubular shaft a disk $u'$. On each disk $u'$ are laterally-projecting pins $u$, against which bear the spring-arms V, with anti-friction rollers, Fig. 3. The number of these pins corresponds with the number of figures on the periphery of the adding-wheel, so that when the adding-wheel is turned the spring-arm will prevent it from moving beyond the number desired, for the anti-friction roller will bear against the pins. In order, for instance, to transmit motion from one adding-wheel U to the next adding-wheel U', for the next higher column, when the wheel U for the lower column has made a complete revolution or indicated nine figures, I combine with the adding-wheels devices which in this instance are mounted in part upon the sliding frame Q and in part on a longitudinal bar R, Figs. 2 and 3, on the fixed frame. That part of the device on the longitudinal bar R is operated upon by the adding-wheel U when carrying is to be done, and places the part on the sliding frame Q in position to operate on the next higher adding-wheel U' through the medium of the disk $u'$.

Figure 11:
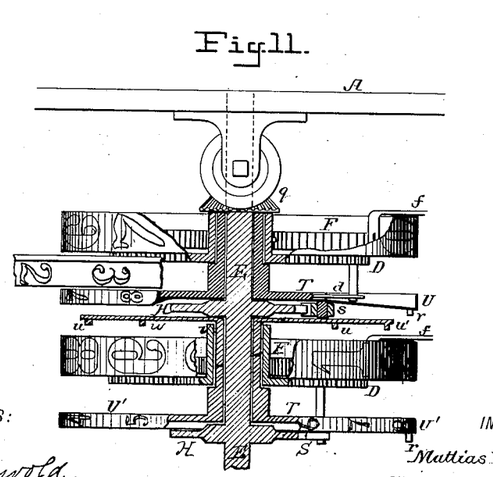
Fig. 11 is a plan view, partly in section, of the indicating and adding wheels, drawn to a larger scale.

Each adding-wheel U U', &c. has upon it a projecting pin $r$, Fig. 11, at such a point that when the zero-mark upon the wheel is uppermost the said pin $r$ will be nearing its lowest position, and will come into contact with an arm $m$ (see dotted lines in Fig. 12) on a pivoted switch gate or cam M, which is carried on a longitudinal bar R on the fixed frame.

Figure 13:
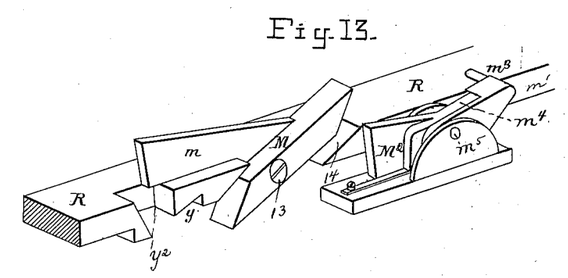
Fig. 13 is a perspective view of the devices for transmitting motion from one adding-wheel to the next.

The switch gate or cam M consists of a switch-point pivoted at 13 in a notch in the side of the bar R, and of such a shape that when the switch is closed the bar is continuous, as shown in Fig. 2; but when the switch is turned to the open position an inclined notch or groove is left in the side of the bar, as shown in Figs. 12 and 13. On the back of the switch is an arm $m$, which, when the switch is closed, lies in the path of the pin $r$ on the adding-wheels U U', &c. The rotation of the wheel U in the direction of its arrow, Fig. 12, results in the depression of the arm $m$ by the pin $r$ and the opening of the gate or cam from the position shown in Fig. 2 to that shown by full lines in Figs. 12 and 13.

The switch-gate is held in either of its extreme positions—that is, open or closed—by means of a spring $n$, with a V-shaped end pressing upon a pin $n'$, carried by the arm $m$ of the switch gate or cam, Figs. 3 and 12.

Secured diagonally across the bottom plate of the sliding frame Q or cash-drawer, as shown in Fig. 1, are the movable parts M' of the carrying devices. These movable parts M', Fig. 13, have each two pieces fitted loosely on the same support $m^5$, the part $m'$ extending to the rear and the part M² forward of this support. The part $m'$ is so constructed that normally it rests on the tail-piece or extension $m^4$ of the part M², and is provided with a pin $m^3$, extending laterally over and riding on the fixed bar R, as illustrated in Fig. 13. The part M² is retained in its normal position (shown in Fig. 13 and by full lines in Fig. 12) by the spring $m^2$, pressing on the under side of its tail-piece $m^4$. With all the parts of the carrier devices in their normal positions the pin $m^3$ of part $m'$ rides without obstruction over the fixed bar R, allowing the sliding frame or cash-drawer to be moved freely in or out. When the pin $r$ on the adding-wheels U U', &c., comes into contact with the arm $m$ of the switch gate or cam M and opens the switch, as illustrated in Fig. 12, the pin $m^3$ of the part $m'$ will strike the upwardly-projecting end of the switch gate or cam as the drawer of the sliding frame is pulled out and carry the part $m'$ to the under side of the bar R. The part $m'$ is now pressed down on the tail-piece $m^4$ and lifts the end or nose of the part M² against the tension of the spring $m^2$ upward into the path of the pins $u$ on the carrier-disk $u'$ of the adder U', and as the drawer is pulled farther outward or toward the operator the part M² carries forward the disk $u'$, and consequently its adder U', to the extent of one number or one-tenth of a revolution, as will be understood on reference to Fig. 12. As the succeeding cash sales are added up or registered, the tens, hundreds, thousands, &c., are thus transmitted from one adding-wheel to the next higher one. As the laterally-projecting pin $m^3$ on the tail-piece $m'$, Fig. 13, passes to the lower side of the bar R in the above-described movement it closes the switch gate or cam M by acting upon its under side, and thereby lifts the arm $m$ again into the path of the pin $r$ on the adding-wheels U U', &c. The switch-gate will now remain closed under the control of the spring $n$ until the adding-wheel which caused its operation has completed another revolution. As the drawer is pulled still farther out, the pin $m^3$ on the tail-piece $m'$ passes up through the notch $y^2$, Figs. 2 and 12, to the upper side of the bar R, while the end or nose of the lever M², released from the control of the tail-piece $m'$, drops down under the action of the spring $m^2$, Fig. 12, to its normal position. The laterally-projecting pin on the tail-piece $m'$ will on the return movement of the drawer travel freely over the upper side of the bar R and over the switch-gate M open as well as closed, for the tail-piece $m'$ has sufficient independent motion to allow the projecting pin $m^3$ to ride easily over the projecting end of the open switch-gate without closing it should it find the switch-gate open when it reaches it on this return movement. I also form on the under side of the bar R, which carries the switch gate or cam, one or more notches $y$, into which the tail-piece $m'$ will enter, Fig. 12, should the operator try to push back the sliding frame or drawer after the pin on the tail-piece $m'$ has passed to the under side of the bar R and closed the switch-gate, as described. This compels the operator to pull the drawer fully out and complete every carrying which the carrying device has been set to perform, as described.

In order to prevent any failure of the proper transmission of movement from one adding-wheel to the next higher adder, such as might occur where two or more of the parts M of the carrying devices were set together, I have arranged the movable parts M' of the carrying devices out of line with the axis of the shaft, as illustrated in Fig. 1, so that no two adding-wheels can be operated by them at the same time, and have in this manner provided for transmitting the necessary motion or "carrying" successively from the adding-wheel of one denomination to the adding-wheel of the next higher denomination through the entire series of adding-wheels.

As in my former patented machine, the connection between each indicating-wheel and its adjoining or corresponding adding-wheel is through the medium of a pawl $d$ on the wheel D engaging with the ratchet-wheel T, formed on or attached to the adding-wheel U U', Figs. 11 and 12, and so arranged that the wheel D in making its indication after being released by the key passes free without moving the adding-wheel; but on returning the indicating-wheel and number-plate to zero, as described, the indicator-wheel D by means of the pawl attachment carries with it the corresponding adding-wheel an equal distance, or the same number of tenths of a revolution, thus transferring the indicated figure to the adding-wheel.

In order to return the successive adding-wheels U U' U², &c., to zero when desired—as, for instance, at the end of a day's sales—I construct the shaft which supports the several wheels with fixed hubs H, each having at one point in its periphery a pin $z$, Fig. 12, and I also place spring-pawls $s$ on the adding-wheels, these pawls occupying similar positions on the several wheels.

The shaft E, which supports the wheels, is free to turn in bearings in the frame, and when the shaft is rotated by any suitable means the pawls $s$ engage with the pins $z$ on the hubs H. If the pins on the several hubs are in line with each other, the pawls on the several wheels will be in line with them. By turning the shaft in the proper direction, as shown by its arrow, Fig. 12, all the adding-wheels may be brought together, with zero at the proper point. For convenience of operating this shaft E to return the adding-wheels to zero I provide the shaft with beveled gearing $q$, Fig. 11, and a short upright shaft having a squared end for the reception of a key to turn the shaft.

I claim as my invention—

1. An indicating apparatus having interchangeable key-bars for tens, units, &c., each carrying a series of keys, a sliding number-plate, a locking-bolt, and a hinged retaining-frame for the sliding plate.

2. An indicating apparatus having interchangeable key-bars for different denominations, as tens, units, &c., each carrying a series of keys, a sliding number-plate, and a locking-bolt, substantially as described.

3. An indicating apparatus having key-bars each with transverse openings for the reception of the keys, a longitudinal groove on one side for the number-plate, and a longitudinal groove on the other side for the locking-bolt, substantially as described.

4. The combination of the key-bar and the series of keys, each having a spring to tend to keep it elevated, with a sliding number-plate and operating-spring, and a pivoted retaining-frame for the sliding plate acted upon directly by the keys.

5. The combination of the key-bar having a sliding number-plate on one side and a locking-bolt on the other, with a series of operating-keys, each having on one side a shoulder to form a stop for the sliding plate and on the other a catch to engage with the locking-bolt, substantially as described.

6. The combination of the grooved key-bar and operating-keys with a sliding number-plate of T-section and having a rack on one flange, a cog-wheel gearing with the rack, a spring to act on the said wheel, and a retaining-frame for the plate operated by the keys, substantially as described.

7. The combination of the key-bar, keys, and locking-bolt having a projecting finger with a hinged retaining-frame engaging with and retaining the locking-bolt until operated by one of the keys, and a spring to act on the locking-bolt.

8. The combination of the key-bar, keys, and locking-bolt having a spring, with a rock-shaft having a catch to retain the bolt in its outward position and a sliding frame to act on the shaft to free the bolt from the catch, all substantially as described.

9. The combination of the frame and sets of operating-keys with sliding number-plates and a sliding frame having projections to act directly on the said plates to return them to their normal positions, substantially as described.

10. An adding or registering mechanism having a series of adding-wheels and a set of controlling-keys for each of the several wheels, with a cash-drawer to transmit motion from one adding-wheel to the next higher, substantially as described.

11. The combination of the frame and sets of operating-keys with sliding number-plates and locking-bolts, and a sliding frame to act directly on the plates and bolts to return them to their original positions after registry.

12. The combination of the frame and sets of operating-keys with sliding number-plates and a cash-drawer having projections to act on the said plates to return them to their normal positions, substantially as described.

13. The combination of an indicating and registering machine with a cash-drawer free to be moved in and out before the operation of the indicator, but adapted to act upon the moving parts after each indication, substantially as described.

14. The combination of the frame and sets of operating-keys with sliding number-plates, locking-bolts for the keys, and a cash-drawer having projections to act on the said plates and locking-bolts to return them to their normal positions after each registry.

15. The combination of numbered indicating-wheels and operating-springs with keys numbered to correspond and controlling the said wheels, and adding-wheels, also correspondingly numbered and mounted upon the same shaft with the indicating-wheels, all substantially as set forth.

16. The combination of the sliding number-plates, operating-keys, and spring-operated indicating-wheels geared to the number-plates, with a series of adding-wheels mounted upon the same shaft with the aforesaid wheels and operated therefrom, all substantially as set forth.

17. An indicating and registering machine having its indicating-wheels and adding-wheels all mounted upon the same shaft, with a series of devices arranged out of line with the shaft to transmit movement successively from one adding-wheel to the next, substantially as set forth.

18. An indicating and registering machine having indicating and adding wheels representing successive denominations all mounted upon the same shaft, with a sliding frame carrying devices to transfer motion from one adding-wheel to the next higher successively, substantially as specified.

19. The combination of the adding-wheel U of a registering-machine with another adding-wheel U', and a fixed bar having a switch-gate to be opened by the first wheel at each revolution, and a sliding frame carrying a lever, a part of which travels on the bar and is adapted to operate the second wheel on the opening of the said switch-gate, all substantially as described.

20. The combination of the adding-wheel U of a registering-machine with another adding-wheel U', a bar having a switch-gate to be opened by the first wheel at each revolution, a sliding frame carrying a lever with a tail-piece traveling on the bar and adapted to operate the second wheel when the switch-gate is open, the said bar having a notch to prevent return of the sliding frame without completing the registration.

21. The combination of the fixed frame carrying a series of adding-wheels mounted upon a shaft with a sliding frame and devices, substantially as described, mounted part upon the fixed frame and part upon the sliding frame to transfer motion from one wheel to the next.

In testimony whereof I have signed my name to this specification in the presence of two subscribing witnesses.

MATTHIAS R. LONGACRE.

Witnesses:
HENRY HOWSON,
WILLIAM D. CONNER.